US005811173A

United States Patent [19]

Eichhorn et al.

[11] Patent Number: 5,811,173

[45] Date of Patent: Sep. 22, 1998

[54] SHEET OF GLASS WITH GROOVE PATTERN TO PROVIDE DECORATIVE VISUAL EFFECT

[75] Inventors: Keith L. Eichhorn, High Point; Lars Richter, Greensboro, both of N.C.

[73] Assignee: Glass Unlimited of High Point, Inc., High Point, N.C.

[21] Appl. No.: 662,796

[22] Filed: Jun. 12, 1996

Related U.S. Application Data

[60] Continuation of Ser. No. 342,848, Nov. 21, 1994, Pat. No. 5,571,599, which is a division of Ser. No. 938,846, Sep. 1, 1992, Pat. No. 5,409,416.

[51] Int. Cl.$^{6}$ .............................. B32B 3/28; A47G 35/00

[52] U.S. Cl. .......................... 428/167; 428/213; 428/220; 52/204.59

[58] Field of Search .................................... 428/167, 212, 428/542.2, 213, 220, 332, 410, 426; 52/204.59, 311.1

[56] References Cited

U.S. PATENT DOCUMENTS

| | | | |
|---|---|---|---|
| D. 184,141 | 12/1958 | Mook | D33/9 |
| D. 276,188 | 10/1984 | Metzner | D28/25 |
| D. 285,505 | 9/1986 | Billiet | D6/300 |
| D. 288,746 | 3/1987 | Allekotte | D6/300 |
| 773,306 | 10/1904 | Wadsworth | 428/167 |
| 1,785,401 | 12/1930 | Zuckerberg | 428/167 |
| 1,929,893 | 10/1933 | Kinney | 51/3 |
| 2,071,411 | 2/1937 | Lamesch | 428/167 |
| 2,294,940 | 9/1942 | Skolnik | 428/167 |
| 2,796,707 | 6/1957 | Meter | 51/74 |
| 3,346,410 | 10/1967 | McCarthy | 428/167 |
| 3,612,030 | 10/1971 | Blum | 125/1 |
| 3,678,628 | 7/1972 | McMaster | 51/5 |
| 3,839,113 | 10/1974 | Yoshida et al. | 156/24 |
| 4,011,692 | 3/1977 | Bos et al. | 51/323 |
| 4,029,531 | 6/1977 | Marinelli | 156/647 |
| 4,046,619 | 9/1977 | Rice et al. | 156/645 |
| 4,129,671 | 12/1978 | Greenberg | 428/48 |
| 4,131,103 | 12/1978 | Ishizuka | 125/13.01 |
| 4,138,515 | 2/1979 | Dial | 428/167 |
| 4,268,347 | 5/1981 | Stephens | 156/628 |
| 4,813,990 | 3/1989 | Thorn | 65/105 |
| 4,814,213 | 3/1989 | Thorn | 428/34 |
| 5,409,416 | 4/1995 | Eichhorn et al. | 451/41 |

FOREIGN PATENT DOCUMENTS

| | | | |
|---|---|---|---|
| 0380832 | 8/1990 | European Pat. Off. | 51/107 |
| 8802298 | 4/1988 | WIPO | 51/283 R |

OTHER PUBLICATIONS

Reference A. no date; no page number; no title; no author.

*Primary Examiner*—Donald Loney
*Attorney, Agent, or Firm*—Rhodes, Coats & Bennett, L.L.P.

[57] ABSTRACT

A plurality of parallel adjacent grooves are formed in at least one surface of a sheet of glass. Each of the multiple grooves has a maximum width dimension of 7 millimeters and a minimum angle between the grooved wall and the plane of the glass surface of 12°. The grooves are formed by affixing the sheet of glass to the conveyor of a grinding machine and subjecting the glass sheet to one or more grinding wheels in which the surface thereof has a plurality of parallel adjacent grooves formed therein of the mirror image of the grooves to be formed in the glass, wherein the grooves are simultaneously cut in a single path.

8 Claims, 2 Drawing Sheets

SHEET OF GLASS WITH GROOVE PATTERN TO PROVIDE DECORATIVE VISUAL EFFECT

This is a continuation application of Ser. No. 08/342,848, filed Nov. 21, 1994, now U.S. Pat. No. 5,571,599 which is a divisional application of Ser. No. 07/938,846, filed Sep. 1, 1992, now U.S. Pat. No. 5,409,416.

BACKGROUND AND SUMMARY OF THE INVENTION

The present invention is directed to decorative glass, and more specifically to annealed glass sheets of the type described in which a plurality of parallel, adjacent grooves are ground into at least one surface thereof for a distinctive visual effect.

In recent years the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expand, the industry has become receptive to glass sheet products which have unique visual effects.

One such visual effect is achieved by the use of a ground groove in the surface of such glass products. The groove is formed by grinding into the surface of an annealed glass sheeting, however, the glass sheets may subsequently be bent, or curved, or further processed (such as by tempering).

Heretofore, it has been commonplace to bevel the side edges of a sheet of glass before emplacing it within a frame or using it as a window, mirror, table top, or table top decoration. Beveling is accomplished essentially by relative movement between the sheet of glass and one or more grinding wheels whose surface is tilted at a small angle with respect to the surface of the glass. There are some instances where a grinding wheel, which normally has a flat peripheral surface, has been formed with a V-shaped surface to grind a single, wide, shallow groove in a sheet of glass (commonly referred to as "V-grooving"). The grinding step often is followed by polishing to clear the surface. The width of the peripheral surface of conventional grinding wheels is commonly in the range of 10 millimeters to 20 millimeters. Therefore, such V-grooves known heretofore have been essentially at least 10 millimeters in width and very shallow. The purpose of V-grooves as described hereinabove has been to simulate panels of glass in a larger sheet without use of individual panes and associated framework. As a result, very little refraction or reflection occurs and no striking visual difference between the grooved section and the plain section is achieved.

In accordance with the present invention, a different and striking visual effect is achieved by forming a plurality of narrow, parallel grooves or ribs with sharper angles. Such grooves have steeper walls, thereby achieving more extreme refraction and/or reflection results, more distortion, and therefore a more striking visual difference between the ribbed or grooved section and the other surface of the glass sheet. It was found that there was no existing satisfactory technique to grind multiple, parallel, adjacent, narrower grooves in the surface of a sheet of glass. One way to accomplish such a result with equipment available, which has been used in the past on wider grooves with shallower angles, is to subject the glass in a single pass to a successive plurality of grinding and polishing wheels, each offset along the length of the path of travel of the glass sheet. As the workpiece passes by the grinding wheels, each wheel forms one groove. The alternative approach is to run the glass sheet past the same grinding wheel for a plurality of passes with the sheet being moved laterally after each pass. Polishing occurs in the same manner with a different wheel. First of all, because of the configuration of known grinding wheels, such grooves have to be very shallow. Additionally, when each groove is formed separately, it is extremely difficult to achieve and maintain precise alignment of the grinding wheels, so that the grooves are formed parallel to each other. A slight misalignment essentially ruins the parallel arrangement and results in a reject. Also the machine must be slowed down considerably.

Thus, to accomplish the desired visual effect, it is necessary to devise a different approach to form the ribbed pattern of the present invention. Here, as is different from conventional glass sheet grinding techniques, there is provided a plurality of parallel adjacent grooves in the surface of the sheet of glass, each of the grooves having a maximum width dimension of approximately 7 millimeters and a minimum angle between the grooved wall and the plane of the plate glass surface of 12°. In a preferred technique, the grooves are rough cut, then finish cut and polished during a single pass of the glass sheet along a horizontal path through a grinding machine. Such a machine includes a rough cut diamond wheel, one or more finishing cut diamond wheels, and one or more polishing wheels rotating about a horizontal axis. Alternatively, while the workpiece is held stationary, a rough cut grinding wheel is passed along the surface in a prescribed path to form all grooves or ribs simultaneously. Next, a finish cut grinding wheel is passed along the surface in the same or similar manner, followed by polishing with one or more polishing wheels. In each of the aforesaid techniques, the grinding surface of each of the grinding wheels includes a plurality of parallel adjacent grooves formed in the periphery thereof, the grooves being substantially the mirror image of the groove pattern to be formed on the glass. By altering the normal flat surface of the diamond grinding wheel and by providing a grooved surface therein on a rough cut wheel and a finishing cut wheel, the plurality of grooves can be formed simultaneously, which assures that they are parallel and remain in relative alignment with each other.

The resulting grooves in the surface of the glass sheet are much narrower, and may have side walls with a sharper angle from the plane of the glass surface. This results in a significant difference in the visual effect observed from one side of the glass sheet in light passing from the opposite side or in light reflected in the case of a mirror. The emerging light rays from the walls of the groove are bent at a more extreme angle, and therefore the diffusion or distortion is significantly more remarkable. As a result, the visual effect is substantially different between the grooved section and the non-grooved section.

Further, in accordance with the invention, it has been determined that each of the plurality of grooves should have a maximum width dimension of 7 millimeters. It is desired that the depth of the cut be as deep as possible without adversely affecting the strength and integrity of the glass sheet beyond acceptable standards. In order to obtain a good scattering of light as a result of the refraction caused by the side walls of the grooves, the minimum angle between the groove wall and the plane of the glass surface is approximately 12°. Such parameters permit the grinding of grooves in glass sheets having thicknesses in the range of one-eighth to one inch.

A preferred method which has been developed for forming the grooved glass sheet of the present invention starts with the dressing (or forming) of the grinding wheel surface to provide the desired groove configuration. First a rough cut diamond particle wheel is formed in which the peaks and valleys are somewhat rounded. It is very difficult to grind a flat piece of glass into a precise grooved configuration in a single cut because, when a large quantity of glass is removed, it is difficult to maintain close tolerances. Therefore, it is preferable to first subject the workpiece to a rough cut diamond grinding wheel which roughs out the approximate shape of the grooved configuration, then subject the glass to one or more downstream finishing cut grinding wheels, which form the finer, more precise cut to complete the grooved configuration. This is followed by one or more polishing wheels. The two wheels are then mounted sequentially on a horizontal grinding machine and sheets of glass are passed therebeneath on a conveyor belt. The sheet of glass must be first fixed to the conveyor, then the grooves can be simultaneously rough cut and simultaneously finish cut during a single pass. Alternatively, the grooved configuration may be formed by holding the workpiece stationary and moving one or more grooved grinding wheels and polishing wheels to form the patterns of multiple grooves.

It is therefore an object of the present invention to provide a decorative glass sheet having a unique decorative visual effect.

It is another object of the present invention to provide a decorative glass sheet having a plurality of narrow, parallel, adjacent grooves in at least one surface thereof.

It is still another object of the present invention to provide a technique and tool for forming the decorative glass of the present invention wherein all grooves in a groove configuration are formed simultaneously.

Other objects and a fuller understanding of the invention will become apparent upon reading the following detailed description of a preferred embodiment along with the accompanying drawings in which:

DETAILED DESCRIPTION OF THE PERFERRED EMBODIMENT

Figure 1:
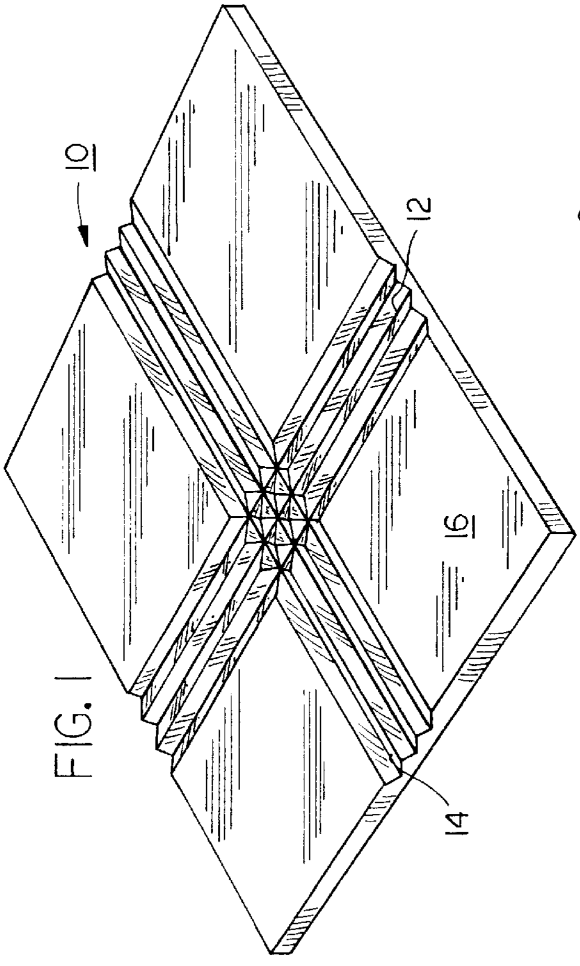
FIG. 1 is a perspective view of a portion of a sheet of glass sheeting grooved in accordance with the present invention.

Turning now to the drawings, and more particularly first to FIG. 1, there is illustrated a sheet of glass 10 having a first series of grooves 12 and a second series of grooves 14 extending thereacross in paths that are perpendicular to each other. Grooves 12,14 are both formed in accordance with the present invention. Pieces of glass sheet may be decorated by having parallel series of grooves, or a single series of grooves, it not being necessary that the grooves extend perpendicular to each other. Once the grooves are formed, the difference between the grooved portions 12,14 and the non-grooved portions 16 of the glass are striking. Whereas the non-grooved portions 16 may be transparent, translucent, opaque, or reflective, the angular walls of grooves 12,14 cause a refraction of light rays which results in a distortion of objects on one side of the glass when viewed from the other. A similar effect is achieved in mirror glass although light obviously does not pass from one side of the mirror to the other. The more extreme the angle of the walls forming the grooves and the more the number of grooves, the more extreme the refraction or reflection, and thus the more the distortion. A considerable number of quite pleasing visual effects can thus be achieved.

The sheet of glass 10 is conventional commercially available annealed glass which normally comes in thicknesses in the range of one-eighth inch and one inch. The glass may either be transparent, frosted, translucent, opaque, or reflective. In each case, the difference between the grooved portion and the non-grooved portion will lead to a striking decorative visual effect.

Figure 2:
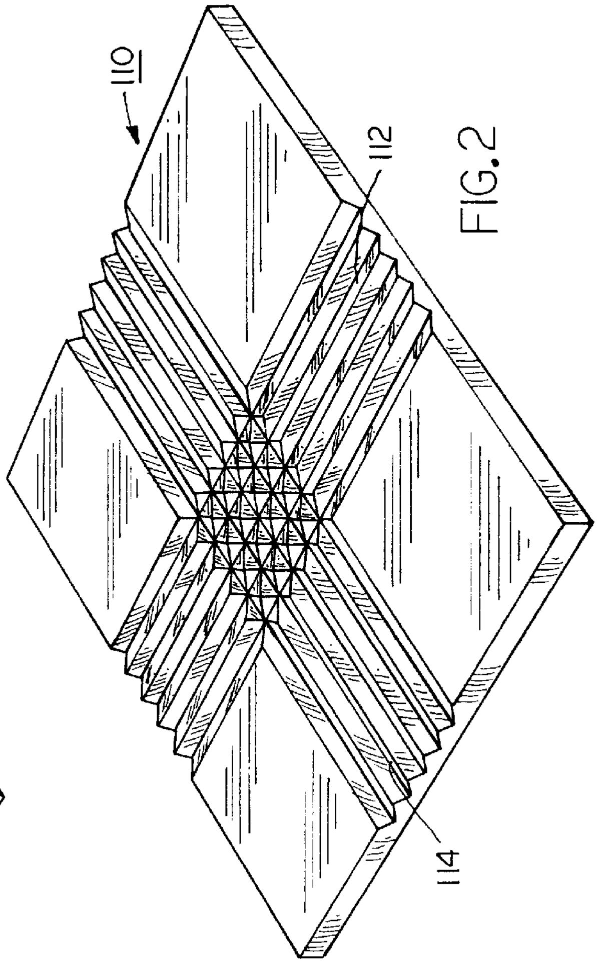
FIG. 2 is a perspective view, similar to FIG. 1, except showing an alternate groove pattern.

In FIG. 2, there is illustrated a second embodiment 110 in which the grooved portions 112,114 are formed with five grooves instead of three as illustrated in FIG. 1. While the five groove pattern is generally wider, as will be described hereinbelow, the difference in visual effects is otherwise quite similar.

Figure 3:
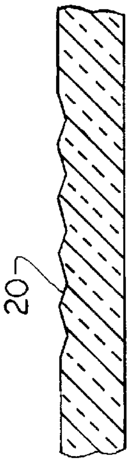
FIG. 3 is a sectional view illustrating a plurality of adjacent, relatively shallow, parallel grooves.
Figure 4:
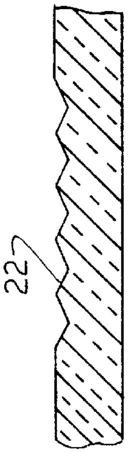
FIG. 4 is a sectional view similar to FIG. 3, except showing slightly deeper grooves.
Figure 5:
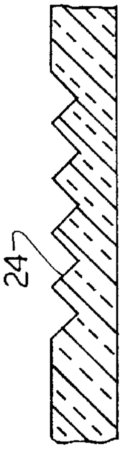
FIG. 5 is a sectional view similar to FIGS. 3 and 4, except showing yet deeper grooves.

In FIGS. 3–5, there is illustrated in each case, for the purposes of comparison, a five groove pattern. The difference between the three embodiments of FIGS. 3–5 are the angle between the grooved wall and the plane of the glass surface and the depth of cut. Thus, in FIG. 3 there is illustrated grooves having angles of approximately 12°; in FIG. 4 the angles between the side walls of the grooves and the plane of the glass sheet are approximately 25°; and in FIG. 5 the angle is approximately 45°. In each case, the alteration, whether by refraction, reflection or a combination of the light rays, leads to sufficient distortion to cause a visually pleasing effect. It has been found that angles of less than 12° provide extremely low refractive distortion and therefore are unsatisfactory. The upper limit of the angles of inclination is only limited by the ability to dress the surface of the grinding wheel to form the small included angles 34 at the bottom of the wheel groove.

As will be explained hereinafter, the grooves of FIGS. 1–5 are formed by subjecting the glass sheet to a rough cut diamond grinding wheel, then to a finishing cut diamond grinding wheel, then to one or more polishing wheels. The rough cut wheel is placed upstream of the finishing cut in a continuous operation, however, all grooves are rough cut simultaneously, then finish cut simultaneously. Such grinding wheels are conventionally available in widths of 10 millimeters and 19 millimeters. Assuming then that symmetrical, equal width grooves are to be formed, the 10 millimeter wheel can be so ground to form two equal grooves having a width of approximately 5 millimeters apiece or three grooves having a width of approximately 3.3 millimeters. By the same token, the 19 millimeter wheel is suitable to form three or more grooves of equal size and shape. In the case of three grooves, the groove width would be approximately 6.3 millimeters; in the case of four grooves, approximately 5 millimeters; in the case of five grooves, approximately 4 millimeters; and in the case of six grooves, approximately 3 millimeters. After grinding and polishing, the grooved glass sheets are usually tempered.

Figure 6:
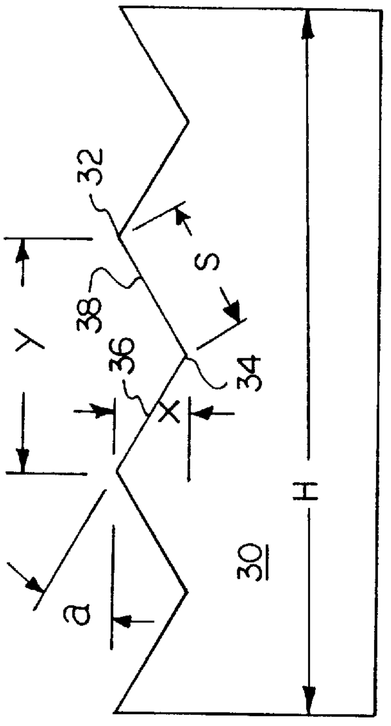
FIG. 6 is a fragmentary sectional view of a diamond cutting wheel.

Turning now to FIG. 6, there is illustrated schematically the surface of a grinding wheel 30, which is the mirror image of the groove pattern formed in the glass. The wheel 30 should be of a diamond particle composition held together by a suitable bonding material. As is shown in FIG. 6, the plurality of grooves in the glass 10,110 will be formed by the surface of the grinding wheel 30. It should be realized that the peaks 32 of the grinding wheel will correspond to the bottom of each groove and the valleys 34 of grinding wheel 30 will correspond to the peaks of the grooves in the glass sheet. The wheel 30 illustrated is best exemplary of the finish cut wheel because its dimensions are closer to the dimensions of the groove pattern. The rough cut wheel will be substantially similar, except the peaks and valleys will not be quite so deep.

The peak-to-peak dimension is represented by the designation y, the height of each peak or groove is designated by an x, the length of the side wall of a groove is designated by s, the angle formed by the side wall of the groove and the plane surface of the glass is designated by the letter a, and the width of the grinding wheel is designated by the letter H. It should be recognized that all of the aforesaid dimensions are relative to each other and somewhat dependent on each other. For example, assuming the width H of the grinding wheel 30 is 10 millimeters, and assuming one wants to form a groove pattern of 3 grooves, then the peak-to-peak dimension y of the groove will be approximately 3.3 millimeters assuming the grooves are to be of the same size and shape. The 10 millimeter wheel might also be used to form a groove pattern of two grooves, in which case the peak-to-peak dimension y would be approximately 5 millimeters. If a groove pattern of more than three grooves is required, one would preferably use the 19 millimeter groove, in which case a four-groove pattern would have a peak-to-peak dimension y of approximately 4.75 millimeters, a five-groove pattern would have a peak-to-peak dimension y for each groove of approximately 3.8 millimeters, and a six-groove pattern would have a peak-to-peak dimension y for each groove of approximately 3.3 millimeters.

While the angular relationship between the side wall s of each groove and the surface of the glass sheet may vary, it should be at least 12° in order to provide a good refractive differential which gives the desired visual effect. Preferably the angle is in the range of 20° to 45° to achieve maximum refractive results. Although the peaks 32 and valleys of the grinding wheel are illustrated as being very sharp, it is apparent that the peaks and valleys can be rounded to form ribs or flutes (grooves with rounded bottoms).

In order to achieve the best refractive results, it is desirable that the groove be as deep as possible and the walls as steep as possible without effecting the strength of the glass beyond acceptable standards. While there is no hard and fast rule, a general rule of thumb is that the depth of cut should not exceed approximately 30% of the thickness of the glass. With this in mind, the following table sets forth some exemplary dimensions for various groove patterns assuming a ⅛" sheet of glass sheeting:

TABLE I

| Number of Grooves | Dimension y | With 25° angle Dimension x | With 35° angle Dimension |
|---|---|---|---|
| 2 (10 mm wheel) | 5 mm | 1.166 mm | 1.751 mm |
| 3 (10 mm wheel) | 3.3 mm | 0.769 mm | 1.188 mm |
| 4 (19 mm wheel) | 4.75 mm | 1.107 mm | 1.663 mm |
| 5 (19 mm wheel) | 3.8 mm | 0.886 mm | 1.330 mm |
| 6 (19 mm wheel) | 3.33 mm | 0.776 mm | 1.166 mm |

Obviously, for thicker pieces of glass, the angles may be somewhat steeper and the x dimension may be deeper. Also, while each groove has been shown to be of the same width, it is not necessary that such be the case, therefore, the width dimensions y may vary from groove to groove in a particular pattern. Also, the shape of each groove may differ in that one wall forming the groove may be a different angle a than the other wall. All of these parameters may vary within the scope of the present invention.

Figure 7:
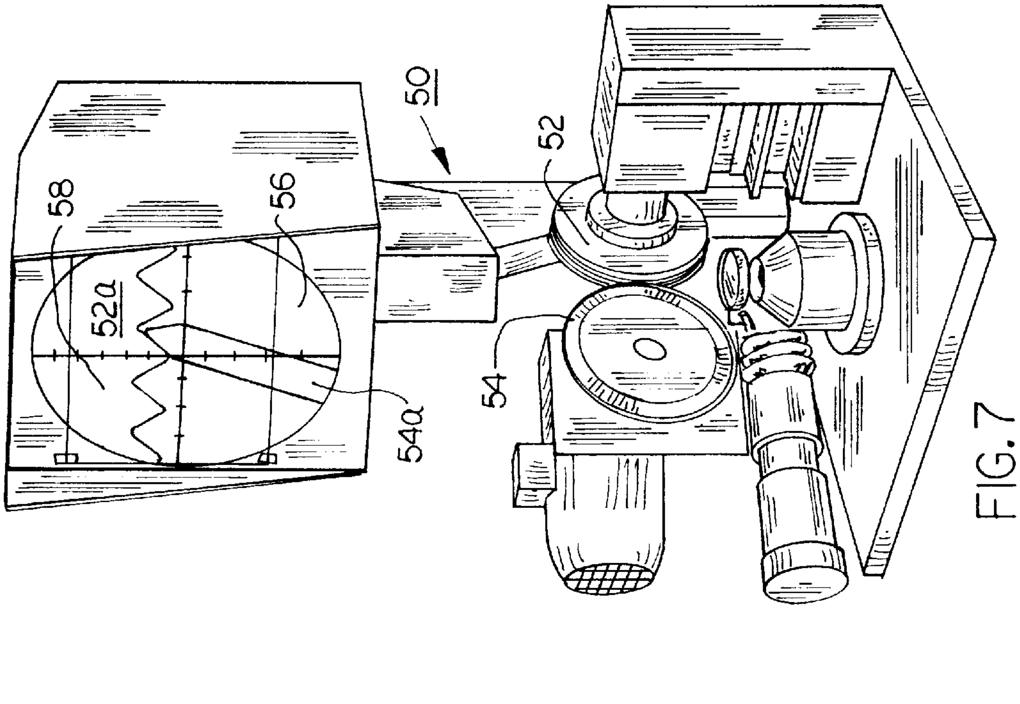
FIG. 7 is a perspective view of an apparatus used to form the grinding wheels.

Turning now to FIG. 7, there is illustrated one appropriate grinding wheel dressing apparatus. As can be seen in FIG. 7, the apparatus 50 includes a spindle for holding the workpiece 52 and a second precisely driven mounting apparatus for holding the dressing tool 54. The dressing tool 54 is moved back and forth and in and out with respect thereto to properly form and dress the wheel. To form the grooves, a first tool 54 is used to rough cut the general shape of the grooves. Then a second tool with a denser diamond cutting wheel having an ⅛" wall thickness and a 60° included angle is used to form the final profile of the grooves on the grinding wheels. The apparatus 50 also includes a magnifying viewer 56 that illustrates and displays an enlarged picture of the grinding wheel and trimming tool. The enlargement is approximately 10 times. By using a template of the same scale as the viewing device, the grinding wheel may be moved back and forth and in and out appropriately to achieve the desired surface configuration.

Figure 8:
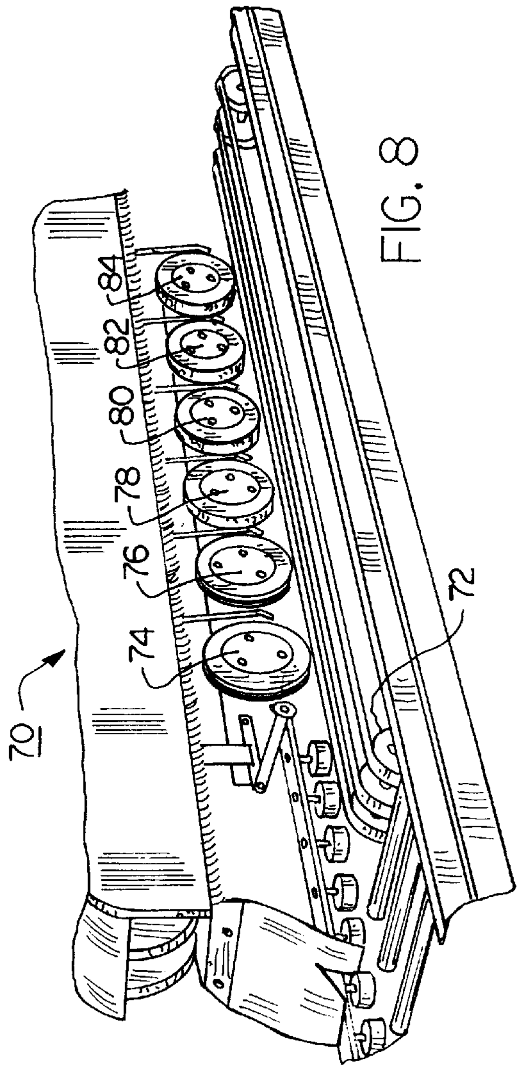
FIG. 8 is a perspective view of a portion of one type of a grinding machine set up to form the grooves of the present invention.

In FIG. 8, there is illustrated one type of grinding apparatus on which the glass sheet is positioned and moved. This is a relatively conventional apparatus 70 which includes a conveying apparatus 72 upon which the workpiece is placed. The conveyor moves the workpiece longitudinally past one or more grinding wheels 74,76. The workpiece is held onto the conveyor by clamps or vacuum. As the workpiece is moved past the first grinding wheel, the rough cut is formed. The workpiece then progresses past the second finishing wheel 76 where the finishing cut is formed. Finally the grooves are polished by subjecting them to one or more polishing wheels 78,80,82,84. The important relationship of the grinding operation to the present invention is that all grooves of one of the groove patterns 12,14,112,114 are rough cut simultaneously and then finish cut simultaneously. This permits the grooves to be maintained parallel and adjacently spaced.

Alternatively, the workpiece can be held and subjected to a plurality of grinding and polishing wheels mounted on a movable, precisely controlled head. This might be more appropriate for a pattern in which the grooves are curved or not in a straight line.

There has been described and illustrated hereinabove a detailed description of a preferred embodiment. Obviously, various changes and modifications might be made to the embodiment described without departing from the scope of the invention which is set forth is the accompanying claims in which:

What is claimed is:

1. A decorative glass sheet comprising a sheet of glass having a thickness in the range of ⅛ inch to 1 inch, at least one surface of said glass sheet having at least one decorative band extending thereacross and a non-banded area, said band comprising a plurality of parallel, immediately adjacent, straight-walled, ground and polished grooves, each of said grooves having a maximum width dimension of 7 millimeters, a maximum depth of no greater than 30% of the thickness of said glass sheet, and an anile of inclination between the groove wall and plane of the glass surface of between about 20° and 45°, whereby said grooves form with said non-banded area a striking decorative visual effect in which the bands tend to distort objects therebehind or reflected therein.

2. The decorative glass sheet of claim 1 wherein said band has an overall width of from about 10 millimeters to about 19 millimeters.

3. The decorative glass sheet according to claim 1 including at least one said band intersecting another of said bands at a substantially right angle thereto.

4. The decorative glass sheet according to claim 1 wherein said band consists of from two to six of said grooves.

5. The decorative glass sheet according to claim 1 wherein said non-banded area is translucent.

6. The decorative glass sheet according to claim 1 wherein said glass sheet is tempered.

7. A decorative glass sheet comprising a sheet of glass having a thickness between about ⅛ inch to 1 inch, at least one surface of said glass sheet having at least one decorative band extending thereacross and a non-banded area, said band comprising of a plurality of parallel, immediately adjacent, straight walled, ground and polished grooves, each of said grooves having a maximum width dimension of 7 millimeters, a maximum depth of no greater than 30% of the thickness of said glass sheet and an angle of inclination between the groove wall and plane of the glass surface of greater than about 20°, whereby said grooves form with said non-banded area a striking decorative visual effect in which the bands tend to distort objects therebehind or reflected therein.

8. The decorative glass sheet of claim 7 wherein said band has an overall width of from about 10 millimeters to about 19 millimeters.

* * * * *

UNITED STATES PATENT AND TRADEMARK OFFICE

CERTIFICATE OF CORRECTION

PATENT NO : 5,811,173

DATED : September 22, 1998

INVENTOR(S) : Keith Eichhorn and Lars Richter

It is certified that error appears in the above-identified patent and that said Letters Patent is hereby corrected as shown below:

In Claim 1, line 10, change the word 'anile' to 'angle'.

Signed and Sealed this

Fifteenth Day of December, 1998

Attest:

BRUCE LEHMAN

*Attesting Officer*

*Commissioner of Patents and Trademarks*